US008734640B2

(12) United States Patent
Shin et al.

(10) Patent No.: US 8,734,640 B2
(45) Date of Patent: May 27, 2014

(54) WATER PURIFYING APPARATUS (75) Inventors: Sung-Yong Shin, Geumcheon-Gu (KR); Deul-Re Min, Geumcheon-Gu (KR)

(73) Assignee: LG Electronics Inc., Seoul (KR)

( * ) Notice: Subject to any disclaimer, the term of this patent is extended or adjusted under 35 U.S.C. 154(b) by 284 days.

(21) Appl. No.: 13/147,126

(22) PCT Filed: Jun. 24, 2009

(86) PCT No.: PCT/KR2009/003387
§ 371 (c)(1),
(2), (4) Date: Jul. 29, 2011

(87) PCT Pub. No.: WO2010/090378
PCT Pub. Date: Aug. 12, 2010

(65) Prior Publication Data
US 2011/0284436 A1    Nov. 24, 2011

(30) Foreign Application Priority Data
Feb. 9, 2009    (KR) .................. 10-2009-0010017

(51) Int. Cl.
*B01D 17/12* (2006.01)
*B01D 35/143* (2006.01)
*B01D 35/18* (2006.01)

(52) U.S. Cl.
USPC ................. 210/85; 62/125; 62/126; 62/129; 62/132; 210/94; 210/103; 210/104; 210/149; 210/175; 210/184; 210/257.1; 222/25; 222/52; 222/146.1; 222/189.06; 345/1.1

(58) Field of Classification Search
USPC ................. 62/125, 126, 129, 132, 157, 159; 210/85–87, 94, 97, 103, 110, 138, 143, 210/149, 175, 184, 257.1, 418; 222/25, 52, 222/54, 59, 64, 146.1, 146.6, 189.06; 345/1.1, 1.2, 1.3, 20
See application file for complete search history.

(56) References Cited

U.S. PATENT DOCUMENTS 5,494,573 A * 2/1996 Schoenmeyr et al. .......... 210/94
5,536,395 A * 7/1996 Kuennen et al. ................ 210/87
(Continued)

FOREIGN PATENT DOCUMENTS

CN    200972596 Y    11/2007
KR    10-0150573    6/1998
(Continued)

Primary Examiner — Joseph Drodge
(74) Attorney, Agent, or Firm — McKenna, Long & Aldridge LLP (57) ABSTRACT A water purifying apparatus, comprises: a filtering unit for filtering water supplied from a wellhead into purified water; a water tank unit including a cold water tank for storing the purified water in a cold water state, and a hot water tank for storing the purified water in a hot water state; a discharging unit for selectively discharging out the purified water stored in the water tank unit; a state detecting unit for detecting an operation state of at least one of the filtering unit, the water tank unit, and the discharging unit; a controller for comparing the information detected by the state detecting unit with a preset reference, thereby judging an abnormal state of the water purifying apparatus; and a state displaying unit for displaying the abnormal state information to outside. When the water purifying apparatus has a breakdown, mal-operated components of the water purifying apparatus may be checked by being displayed on the state displaying unit, without being checked by an A/S specialist. This may reduce the time taken to repair the mal-operated components, thereby enhancing a consumer's satisfaction degree for a service.

13 Claims, 8 Drawing Sheets

(56) References Cited

U.S. PATENT DOCUMENTS

| | | | |
|---|---|---|---|
| 5,679,243 A * | 10/1997 | Cho | 210/94 |
| 5,772,869 A * | 6/1998 | Joung | 210/149 |
| 5,837,147 A * | 11/1998 | Joung | 210/739 |
| 5,855,795 A * | 1/1999 | Chang | 210/744 |
| 6,835,307 B2 * | 12/2004 | Talbert et al. | 210/175 |
| 7,615,152 B2 * | 11/2009 | Tanner et al. | 210/257.1 |
| 7,718,054 B2 * | 5/2010 | Duplessis et al. | 210/85 |
| 7,837,866 B2 * | 11/2010 | Burrows | 210/97 |
| 8,499,578 B2 * | 8/2013 | Ferragut et al. | 62/389 |
| 2002/0050478 A1 * | 5/2002 | Talbert et al. | 210/742 |
| 2005/0139552 A1 * | 6/2005 | Forsberg et al. | 210/748 |
| 2006/0201857 A1 * | 9/2006 | Lin | 210/85 |
| 2008/0237148 A1 * | 10/2008 | Dennis et al. | 210/759 |
| 2009/0249821 A1 * | 10/2009 | Zentner et al. | 62/389 |

FOREIGN PATENT DOCUMENTS

| | | |
|---|---|---|
| KR | 10-0161642 | 8/1998 |
| KR | 10-0583851 | 5/2006 |
| KR | 10-2007-0109573 | 11/2007 |
| KR | 10-2008-00095682 | 10/2008 |
| KR | 10-2009-0107235 | 10/2009 |

* cited by examiner

Fig. 11

WATER PURIFYING APPARATUS

This application is a National Stage Entry of International Application No. PCT/KR2009/003387, filed Jun. 24, 2009, and claims the benefit of Korean Application No. 10-2009-0010017, filed on Feb. 9, 2009, all of the applications are hereby incorporated by reference for all purposes as if fully set forth herein.

TECHNICAL FIELD

The present invention relates to a water purifying apparatus, and more particularly, to a water purifying apparatus having a function to inform a manufacturer or a consumer when a breakdown of components thereof has been detected.

BACKGROUND ART

Generally, a water purifier serves to filter harmful ingredients such as foreign materials or heavy metals included in water in a physical or chemical manner. A similar apparatus to the water purifier may include an ionized water apparatus, etc.

This water purifier may be largely divided into a filtering unit for filtering contaminants from raw water, a water tank unit for storing purified water having passed through the filtering unit, and a discharging unit for discharging out the purified water stored in the water tank unit.

Once power is supplied to the water purifying apparatus, raw water is supplied to the filtering unit to be purified, and then is stored in the water tank unit. Then, the purified water stored in the water tank unit is discharged out through the discharging unit according to a user's selection, etc.

The water purifying apparatus is provided with various types of components and sensors. When one of these components or sensors has a breakdown, the water purifying apparatus may be mal-operated.

When the water purifying apparatus is mal-operated, the water purifying apparatus is repaired by an after-service (AS) specialist who has visited a purchaser's home. The AS specialist checks the current state of each of the components and sensors, and thus to find the cause of the breakdown. Then, the AS specialist repairs the mal-operated component or sensor, or replaces it by a new one.

DISCLOSURE OF INVENTION

Technical Problem

However, in the conventional art, the A/S specialist has to check whether components or sensors relating to the breakdown of the water purifying apparatus are mal-operated. This may cause a lot of time to be taken in finding the cause of the breakdown, resulting in the purchaser's dissatisfaction.

Furthermore, since the purchaser comes to know the cause of the breakdown only through the A/S specialist, the purchaser may have a doubt whether the A/S specialist has overcharged for the original costs.

Accordingly, has been proposed the necessity to develop a water purifying apparatus having a function to display the cause of the breakdown thereof so that the consumer or A/S specialist can recognize the cause.

Technical Solution

Therefore, it is an object of the present invention to provide a water purifying apparatus having a function to detect whether various components and sensors thereof are mal-operated, and to display the mal-operated state to outside.

To achieve these and other advantages and in accordance with the purpose of the present invention, as embodied and broadly described herein, there is provided a water purifying apparatus, comprising: a filtering unit for filtering water supplied from a wellhead into purified water; a water tank unit including a cold water tank for storing the purified water in a cold water state, and a hot water tank for storing the purified water in a hot water state; a discharging unit for selectively discharging out the purified water stored in the water tank unit; a state detecting unit for detecting an operation state of at least one of the filtering unit, the water tank unit, and the discharging unit; a controller for comparing the information detected by the state detecting unit with a preset reference, thereby judging an abnormal state of the water purifying apparatus; and a state displaying unit for displaying the abnormal state information to outside.

In the water purifying apparatus, the state displaying unit may comprise a first display part having at least three flash portions turned-on in a predetermined color and separately turned on/off from each other; and a second display part having at least three flash portions turned-on in a different color from the color of the first display part, and separately turned on/off from each other.

In the water purifying apparatus, each of the first and second display parts may be implemented as the flash portions are stacked with each other in upper and lower directions.

In the water purifying apparatus, the first display part may be configured to be turned on in red, while the second display part may be configured to be turned on in blue.

In the water purifying apparatus, the first display part may be configured such that the number of the flash portions that are turned on increases according to the temperature of hot water stored in the hot water tank.

In the water purifying apparatus, the second display part may be configured such that the number of the flash portions that are turned on increases according to the temperature of cold water stored in the cold water tank.

The state detecting unit may be configured to input a predetermined signal to a hot water sensor provided to detect an inner temperature of the hot water tank, and then to detect an output signal. Here, when the output signal from the hot water sensor is different from a preset value, the controller may judge that the hot water sensor is in a mal-operated state. And, the state displaying unit may be configured to make all the flash portions of the first display part flicker.

When it is judged that the hot water sensor has a breakdown, the controller may be configured to convert the current state of a heater provided to heat the hot water tank, into an 'OFF' state.

The state detecting unit may be configured to input a predetermined signal to a cold water sensor provided to detect an inner temperature of the cold water tank, and then to detect an output signal. Here, when the output signal from the cold water sensor is different from a preset value, the controller may judge that the cold water sensor is in a mal-operated state. And, the state displaying unit may be configured to make all the flash portions of the second display part flicker.

When it is judged that the cold water sensor has a breakdown, the controller may be configured to stop the driving of a refrigerating cycle provided to cool the cold water tank.

In the water purifying apparatus, the state detecting unit may detect an 'ON' state of the heater for heating the hot water tank, and an inner temperature of the hot water tank per a preset period. When an increase width of the inner temperature of the hot water tank per a preset period is less than a preset increase width, the controller may judge that the heater is mal-operated. And, the state displaying unit may be configured to make the two flash portions flicker, the two flash portions from the upper direction among the flash portions of the first display part.

Here, the controller may be configured to convert the current state of the heater into an 'OFF' state.

In the water purifying apparatus, the state detecting unit may detect a driving state of a refrigerating cycle for cooling the cold water tank, and a driving duration of the refrigerating cycle. When the driving duration of the refrigerating cycle is more than a preset driving duration, the controller may judge that the refrigerating cycle is mal-operated. And, the state displaying unit may be configured to make the two flash portions flicker, the two flash portions from the upper direction among the flash portions of the second display part. Here, the controller may be configured to convert the current state of the refrigerating cycle into an 'OFF' state.

In the water purifying apparatus, the state detecting unit may detect an 'ON' state of a raw water valve for opening and closing an inlet of water supplied from a wellhead, and may detect a signal of a flow amount sensor for sensing a flow amount of introduced raw water.

When the signal of the flow amount sensor is constantly maintained for a preset time, or when the signal is not continuous, the controller may judge that the flow amount sensor is mal-operated. And, the state displaying unit may be configured to make one flash portion flicker, the one flash portion located in a second position from the upper side among the flash portions of the second display part.

In the water purifying apparatus, the state detecting unit may detect an accumulation time of water from the discharging unit, and a water level of a storage tank for storing purified water to be supplied into the cold water tank and the hot water tank. When the accumulation time of water is longer than a preset time, and when the water level of the storage tank is higher than a preset water level, the controller may judge that a first water level sensor for sensing a water level of the storage tank is mal-operated. And, the state displaying unit may be configured to make two flash portions flicker, the two flash portions located at the uppermost and lowermost sides among the flash portions of the second display part.

In the water purifying apparatus, the state detecting unit may detect a water level of the storage tank for storing purified water to be supplied into the cold water tank and the hot water tank, and a water level of the hot water tank. When the water level of the storage tank is higher than a preset water level, and when the water level of the hot water tank is lower than a preset water level, the controller may judge that a second water level sensor for sensing the water level of the hot water tank is mal-operated. And, the state displaying unit may be configured to make two flash portions flicker, the two flash portions located at the uppermost and lowermost sides among the flash portions of the first display part.

In the present invention, when the water purifying apparatus has a breakdown, mal-operated components of the water purifying apparatus may be checked by being displayed on the state displaying unit, without being checked by an A/S specialist. This may reduce the time taken to repair the mal-operated components, thereby enhancing a consumer's satisfaction degree for a service.

Furthermore, since the consumer easily checks the mal-operated components of the water purifying apparatus, the reliability for the A/S specialist's explanations may be enhanced.

BEST MODE FOR CARRYING OUT THE INVENTION

Reference will now be made in detail to the preferred embodiments of the present invention, examples of which are illustrated in the accompanying drawings.

Hereinafter, a water purifying apparatus according to a first embodiment of the present invention will be explained in more detail with reference to the attached drawings.

Figure 1:
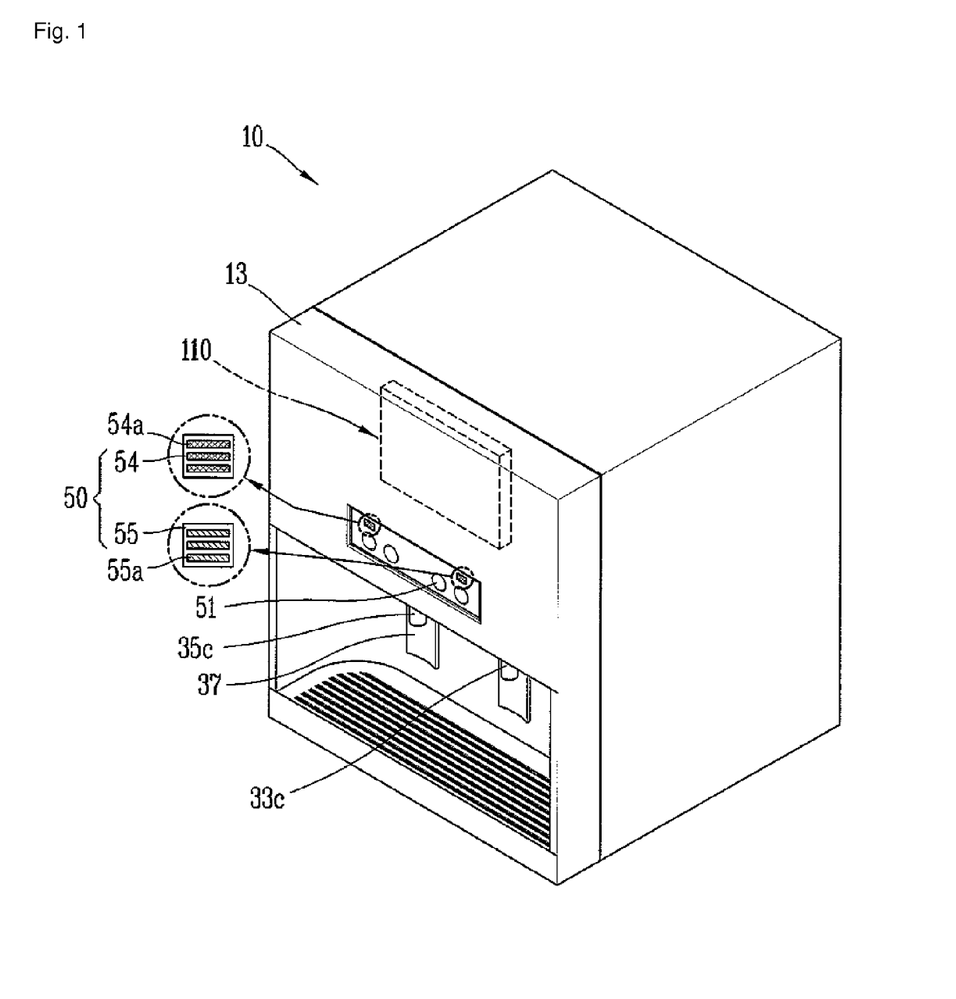
FIG. 1 is a frontal view of a water purifying apparatus according to a first embodiment of the present invention.
Figure 2:
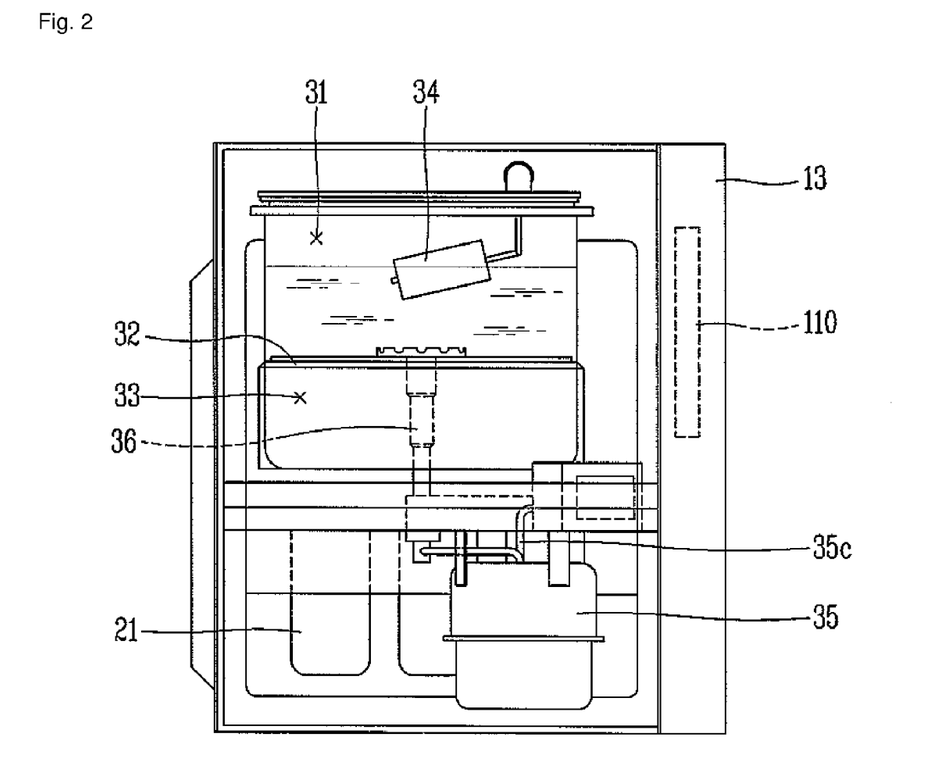
FIG. 2 is a view of a water tank unit of the water purifying apparatus of FIG. 1.
Figure 3:
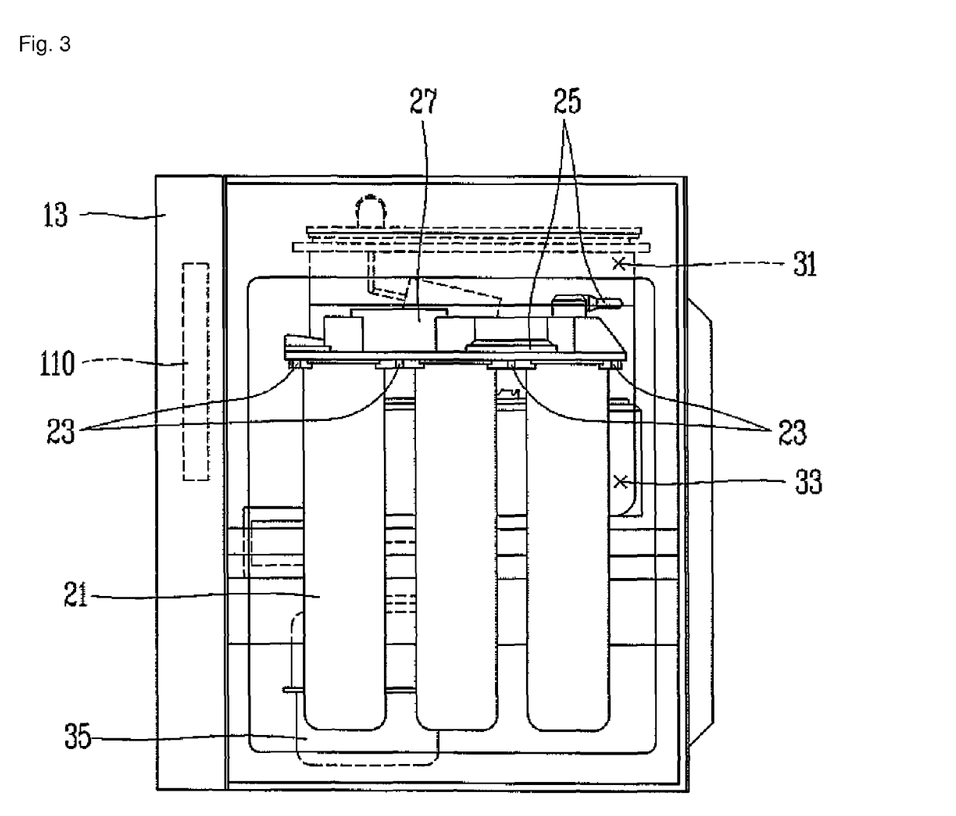
FIG. 3 is a view of a filtering unit of the water purifying apparatus of FIG. 1.
Figure 4:
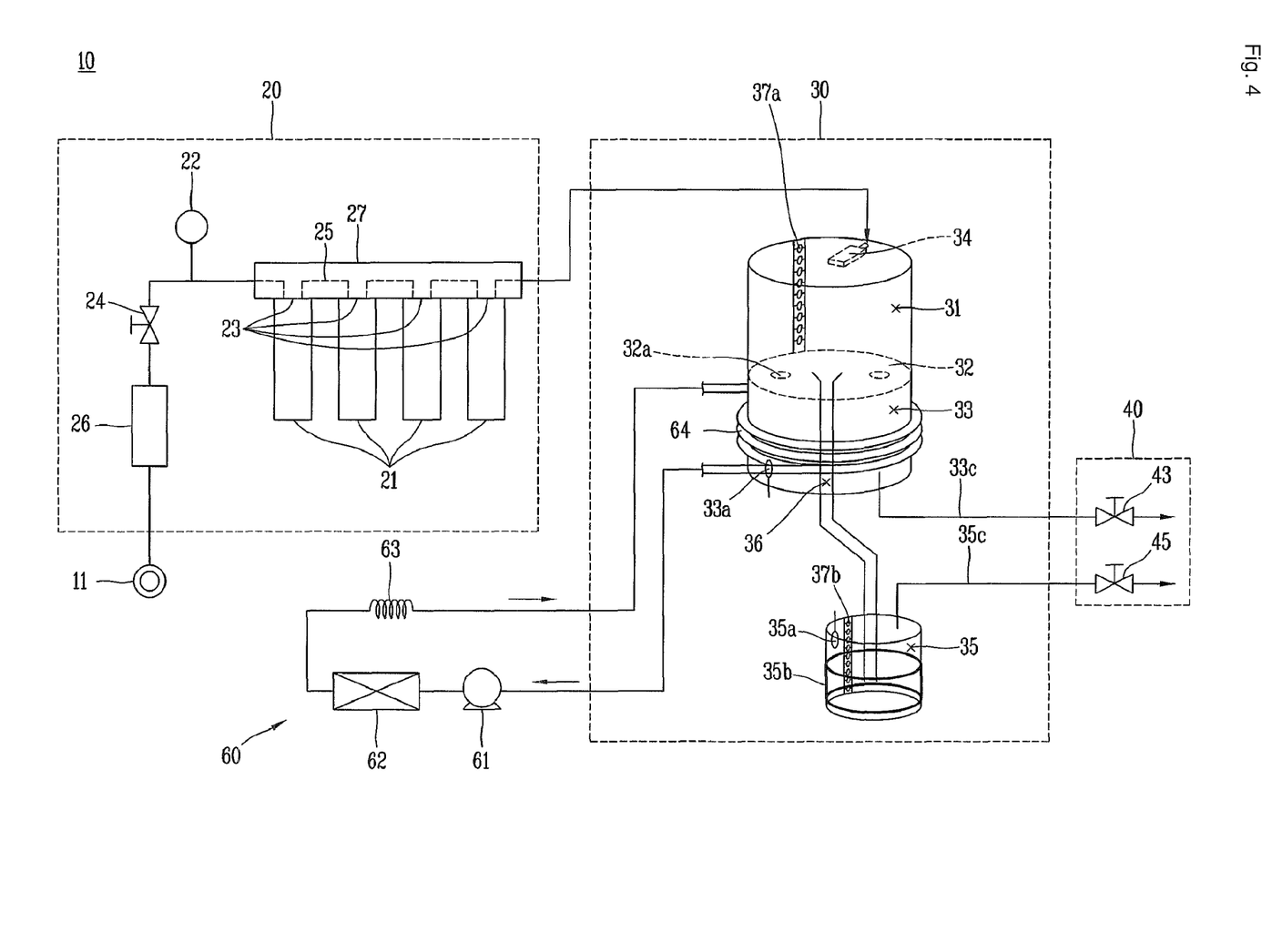
FIG. 4 is a piping diagram schematically showing the water purifying apparatus.
Figure 5:
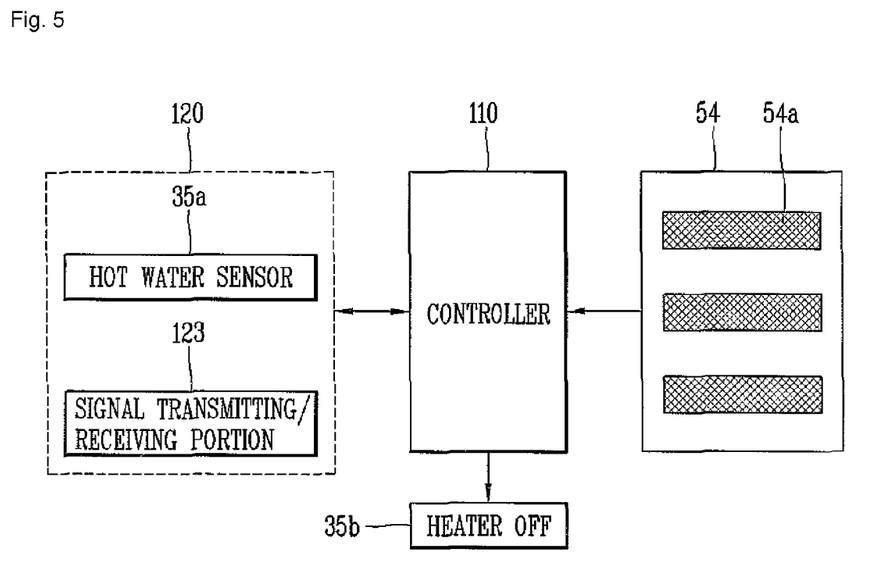
FIG. 5 is a control block diagram showing a method for detecting abnormal state information and displaying the information to outside in a water purifying apparatus according to a first embodiment of the present invention.

FIG. 1 is a frontal view of a water purifying apparatus according to a first embodiment of the present invention, FIG. 2 is a view of a water tank unit of the water purifying apparatus of FIG. 1, FIG. 3 is a view of a filtering unit of the water purifying apparatus of FIG. 1, FIG. 4 is a piping diagram schematically showing the water purifying apparatus, and FIG. 5 is a control block diagram showing a method for detecting abnormal state information and displaying the information to outside in a water purifying apparatus according to a first embodiment of the present invention.

Referring to FIGS. 1 to 5, the water purifying apparatus 10 according to the present invention comprises a filtering unit 20 disposed at a case 13 which forms appearance of the water purifying apparatus 10; a water tank unit 30; a discharging unit 40; and a controller 110 for controlling the operation of the water purifying apparatus 10.

The case 13 is generally formed in a hexahedron shape, but the shape of the case 13 of the present invention is not limited to this.

The case 13 is provided with the filtering unit 20, the water tank unit 30, etc. therein.

And, the discharging unit 40 is provided to be connected to the water tank unit 30 by a pipe, and to be exposed to a front surface of the case 13.

On a front surface of the case 13, further provided are an input unit 51 for receiving an operation signal of the water purifying apparatus 10 from outside, and a state displaying unit 50 for displaying a current state of the water purifying apparatus 10.

The input unit 51 may be implemented in the form of buttons, and the state displaying unit 50 may be implemented in the form of a 7-segment display, a liquid crystal display (LCD), and a light emitting diode (LED) display.

At an inner side of the case 13, provided is the controller 110 for controlling the operation of the water purifying apparatus 10 through signal transmission to each component of the water purifying apparatus 10. The controller 110 may be implemented as a printed circuit board (PCB) having a control circuitry.

The filtering unit 20 serves to filter raw water supplied from a wellhead 11 such as a faucet and a storage tank, into purified water. The filtering unit 20 may include one or more filters 21, and a filter head 27 having filter coupling portions 23 for fixedly-coupling the filters 21 thereto. At the filter head 27, may be formed a flow path through which raw water is supplied to the filters 21, and through which purified water discharged from the filters 21 is supplied to the water tank unit 30.

When the filter 21 is formed in plurality in number, the flow path 25 may be configured to serially connect the plurality of filters 21 to the wellhead 11 and the water tank unit 30.

Differently from this, the filtering unit 20 may be implemented pipes for connecting said one or more inlets of the filters 21 to the wellhead 11, and connecting one or more outlets of the filters 21 to the water tank unit 30.

Here, the filters 21 may include sediment filters, pre-carbon filters, reverse osmosis membrane filters, post-carbon filters, ultra filtration filters, nano-filtration filters, etc.

The sediment filter is provided with a non-woven fabric, thereby filtering foreign materials and floating materials contained in the raw water.

The pre-carbon filter serves to filter chlorine or odor contained in the raw water by applying a surface activated carbon to the raw water.

The reverse osmosis membrane filter serves to filter minute particles having a size of about 0.001 μm.

The post-carbon filter has better absorption than the surface activated carbon of the pre-carbon filter, thereby removing odors and tints.

The ultra-filtration filter is implemented as a thread-shaped membrane having a hollow center, thereby filtering bacteria contained in the raw water.

At the pipe which connects the wellhead 11 and the filtering unit 20, further provided a pre-filter 26 for removing contaminants in advance, the contaminants supplied to the filtering unit 20 to degrade the efficiency of the filters 21; a raw water valve 24 for controlling supply of raw water to the filtering unit 20; and a flow amount sensor 22 for measuring a flow amount of the raw water supplied to the filtering unit 20 so as to check the current state of the pre-filter 26 and so as to determine the time when to replace the pre-filter 26 by a new one.

The raw water valve 24 may be implemented as a gate valve, a cock valve, etc. that are manually opened and closed, or as a solenoid valve that is automatically opened and closed.

The water tank unit 30 may be implemented as a storage tank 31 for storing purified water having passed through the filtering unit 20. The storage tank 31 may be provided with a float valve 34 closed by a floating force when a predetermined amount of the purified water is stored in the storage tank 31.

Besides the storage tank 31, the water tank unit 30 may further include a cold water tank 33 and a hot water tank 35 configured to be communicated with the storage tank 31, respectively.

The cold water tank 33 may be disposed below the storage tank 31 by being integrally formed with the storage tank 31, or so as to be communicated with the storage tank 31 by being coupled to the storage tank 31. The water tank unit 30 may be further provided with a partition plate 32 configured to partition the storage tank 31 and the cold water tank 33 from each other, and having a purified water supplying hole 32a through which purified water stored in the storage tank 31 can be supplied to the cold water tank 33.

The hot water tank 35 may be implemented to be separately formed from the storage tank 31, but to be communicated with the storage tank 31. And, the hot water tank 35 may be configured to receive purified water through a purified-water supplying pipe 36 extending from the partition plate 32.

The purified water stored in the cold water tank 33 is cooled by a refrigerating cycle 60 that is additionally provided.

As the refrigerating cycle 60, may be selected one of well-known refrigerating cycles, each including a compressor 61, a condenser 62, an expander 63 and an evaporator 64. For cooling of the cold water tank 33, the evaporator 64 is preferably wound on the periphery of the cold water tank 33.

Preferably, a heater 35b for heating purified water stored in the hot water tank 35 is wound on the outer circumference of the hot water tank 35.

For an enhanced heat exchange rate, the evaporator 64 and the heater 35b may be disposed inside the cold water tank 33 and the hot water tank 35.

A cold water sensor 33a and a hot water sensor 35a for sensing temperatures of cold water and hot water stored in the cold water tank 33 and the hot water tank 35 may be disposed at the cold water tank 33 and the hot water tank 35, respectively. Each operation of the evaporator 64 and the heater 35b may be controlled based on the temperatures of cold water and hot water detected by the cold water sensor 33a and the hot water sensor 35a.

The hot water tank 35 is separately disposed from the storage tank 31 and the cold water tank 33, in order to prevent lowering of a cooling efficiency by the cold water tank 33, or multiplication of contaminants inside purified water stored in the storage tank 31, each due to heat from the heater 35b.

The discharging unit 40 may include a cold water pipe 33c and a hot water pipe 35c connected to the cold water tank 33 and the hot water tank 35, respectively, and each extending to be exposed to a front surface of the case 13; a cold water discharge valve 43 and a hot water discharge valve 45 for opening and closing the cold water pipe 33c and the hot water pipe 35c, respectively; and a lever portion 37 for generating operation signals of the cold water discharge valve 43 and the hot water discharge valve 45.

The cold water discharge valve 43 and the hot water discharge valve 45 may be implemented as solenoid valves opened and closed by receiving electric inputs, as well as cock valves and mechanical valves.

The state displaying unit 50 may include a first display part 54 and a second display part 55 turned on in different colors from each other. And, the first display part 54 and the second display part 55 are composed of at least three flash portions 54a, 55a, respectively. Each of the first and second display parts 54, 55 may be implemented as the flash portions 54a, 55a are stacked with each other in upper and lower directions.

The first display part 54 may be configured to be turned on in red having an image of hot water, while the second display part 55 may be configured to be turned on in blue having an image of cold water.

The first display part 54 may be configured such that the number of the flash portions 54a that are turned on increases from a lower side to an upper side according to the temperature of hot water stored in the hot water tank 35.

In the same manner, the second display part 55 may be configured such that the number of the flash portions 55a that are turned on increases according to the temperature of cold water stored in the cold water tank 33.

The state displaying unit 50 may be configured to display abnormal state information of the water purifying apparatus 10 to outside, together with a state detecting unit 120 and the controller 110. The state detecting unit 120 detects an operation state of at least one of the filtering unit 20, the water tank unit 30, and the discharging unit 40.

The state detecting unit 120 is composed of the hot water sensor 35a for sensing an inner temperature of the hot water tank 35, and a signal transmitting/receiving portion 123 for inputting a predetermined signal to the hot water sensor 35a, detecting an output signal, and transmitting the output signal to the controller 110.

If an output signal from the hot water sensor 35a is different from a preset value, the controller 110 judges that the hot water sensor 35a is mal-operated. Accordingly, the controller 110 controls a display state of the state display unit 50.

More concretely, the controller 110 changes all the flash portions 54a of the first display part 54 to flicker.

This may allow a consumer or an A/S specialist to recognize the breakdown of the hot water sensor 35a from the display state of the state displaying unit 50.

Preferably, the controller 110 controls the heater 35b to be converted into an 'OFF' state, as well as controls the display state of the state displaying unit 50 to be changed. Accordingly, prevented is preheating of the hot water tank 35 due to a continuous operation of the heater 35b.

Hereinafter, with reference to FIG. 6, will be explained a water purifying apparatus according to a second embodiment of the present invention.

Explanations about the same configuration as that of the first embodiment, and its detailed descriptions will be omitted.

Figure 6:
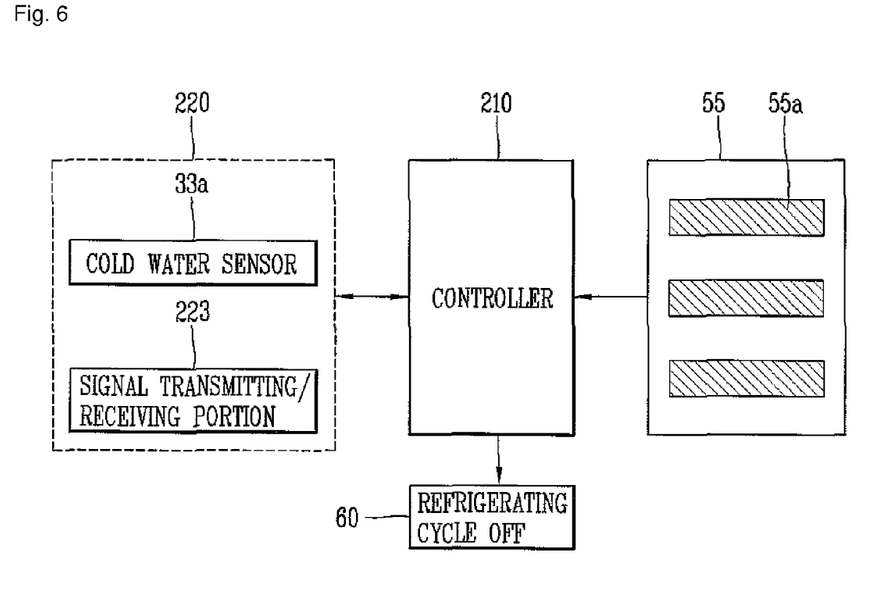
FIG. 6 is a control block diagram showing a method for detecting abnormal state information and displaying the information to outside in a water purifying apparatus according to a second embodiment of the present invention.

FIG. 6 is a control block diagram showing a method for detecting abnormal state information and displaying the information to outside in a water purifying apparatus according to a second embodiment of the present invention.

Referring to FIG. 6, the state displaying unit 50 may be configured to display abnormal state information of the water purifying apparatus 10 to outside, together with a state detecting unit 220 and a controller 210. The state detecting unit 220 detects an operation state of at least one of the filtering unit 20, the water tank unit 30, and the discharging unit 40.

The state detecting unit 220 is composed of a cold water sensor 33a for sensing an inner temperature of the cold water tank 33, and a signal transmitting/receiving portion 223 for inputting a predetermined signal to the cold water sensor 33a, detecting an output signal, and transmitting the output signal to the controller 210.

If an output signal from the cold water sensor 33a is different from a preset signal, the controller 110 judges that the cold water sensor 33a is mal-operated. Accordingly, the controller 210 controls a display state of the state display unit 50.

More concretely, the controller 210 changes all the flash portions 55a of the second display part 55 to flicker.

This may allow the consumer or A/S specialist to recognize the breakdown of the cold water sensor 33a from the display state of the state displaying unit 50.

Preferably, the controller 210 controls the heater 35b to be converted into an 'OFF' state, as well as controls the display state of the state displaying unit 50 to be changed. Accordingly, prevented is preheating of the hot water tank 35 due to a continuous operation of the heater 35b.

Preferably, the controller 210 controls the compressor 61 of the refrigerating cycle 60 to be converted into a stopped state, as well as controls the display state of the state displaying unit 50 to be changed. Accordingly, prevented is freezing of the cold water tank 33 due to a continuous operation of the refrigerating cycle 60.

Hereinafter, with reference to FIG. 7, will be explained a water purifying apparatus according to a third embodiment of the present invention.

Explanations about the same configuration as that of the aforementioned embodiment, and its detailed descriptions will be omitted.

Figure 7:
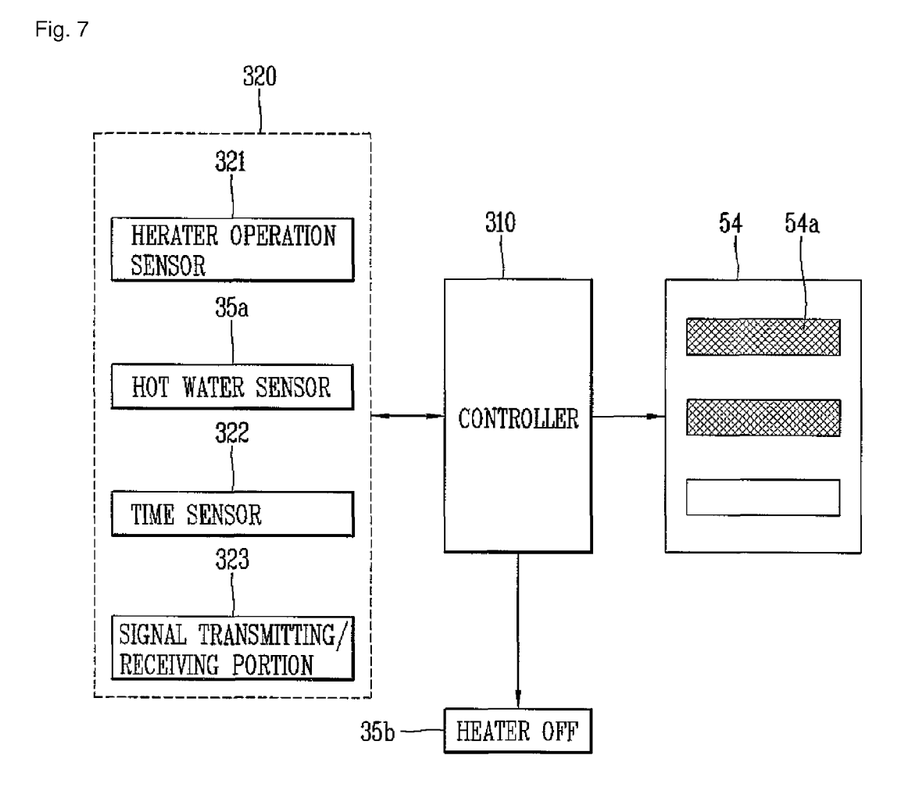
FIG. 7 is a control block diagram showing a method for detecting abnormal state information and displaying the information to outside in a water purifying apparatus according to a third embodiment of the present invention.

FIG. 7 is a control block diagram showing a method for detecting abnormal state information and displaying the information to outside in a water purifying apparatus according to a third embodiment of the present invention.

Referring to FIG. 7, the state displaying unit 50 may be configured to display abnormal state information of the water purifying apparatus 10 to outside, together with a state detecting unit 320 and a controller 310. The state detecting unit 320 detects an operation state of at least one of the filtering unit 20, the water tank unit 30, and the discharging unit 40.

The state detecting unit 320 may include a heater operation sensor 321 for sensing an 'ON' state of a heater provided to heat the water tank unit 35, a hot water sensor 35a for sensing an inner temperature of the hot water tank 35, a time sensor 322 for periodically sensing an inner temperature of the hot water tank 35, and a signal transmitting/receiving portion 323 for transmitting, to the controller 310, temperature information of the hot water tank 35 periodically sensed by the hot water sensor 35a under a state that the heater 35b is turned on.

When an increase width of the inner temperature of the hot water tank 35 per a preset period is less than a preset increase width, the controller 310 may judge that the heater 35b is mal-operated. And, the controller 310 controls a display state of the state displaying unit 50. In this case, the two flash portions 54a from the upper direction, among the flash portions 54a of the first display part 54, are controlled to flicker.

Preferably, the period for sensing an inner temperature of the hot water tank 35 is set as five minutes, and the increase width of the inner temperature per period is set as 5° C.

Preferably, the controller 310 controls the heater 35b to be converted into an 'OFF' state, as well as controls the display state of the state displaying unit 50 to be changed. Accordingly, prevented is unnecessary power consumption due to a continuous operation of the mal-operated heater 35b.

Hereinafter, with reference to FIG. 8, will be explained a water purifying apparatus according to a fourth embodiment of the present invention.

Explanations about the same configuration as that of the first embodiment, and its detailed descriptions will be omitted.

Figure 8:
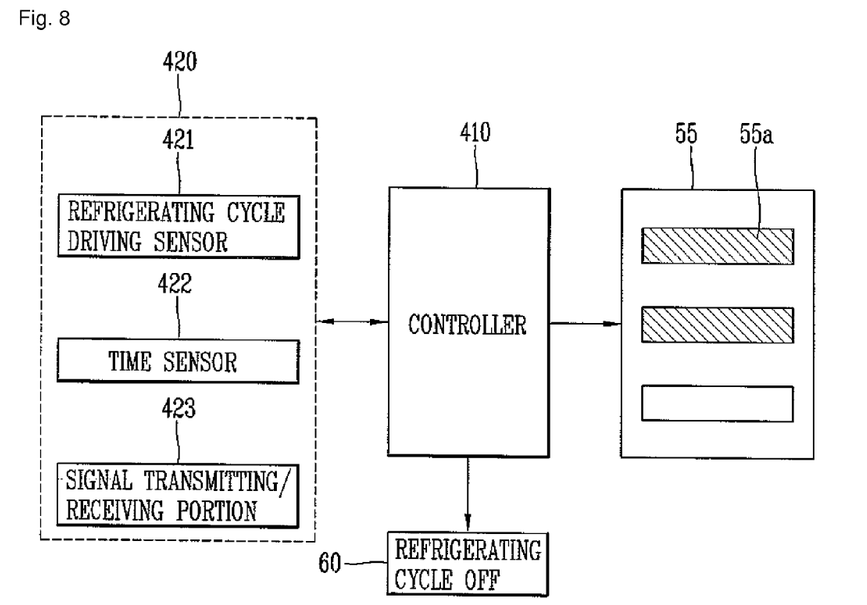
FIG. 8 is a control block diagram showing a method for detecting abnormal state information and displaying the information to outside in a water purifying apparatus according to a fourth embodiment of the present invention.

FIG. 8 is a control block diagram showing a method for detecting abnormal state information and displaying the information to outside in a water purifying apparatus according to a fourth embodiment of the present invention.

Referring to FIG. 8, the state displaying unit 50 may be configured to display abnormal state information of the water purifying apparatus 10 to outside, together with a state detecting unit 420 and a controller 410. The state detecting unit 320 detects an operation state of at least one of the filtering unit 20, the water tank unit 30, and the discharging unit 40.

The state detecting unit 420 may include a refrigerating cycle driving sensor 421 for sensing a driving state of the refrigerating cycle 60 provided to cool the cold water tank 33, a time sensor 422 for sensing a driving duration of the refrigerating cycle 60, and a signal transmitting/receiving portion 423 for transmitting information of the driving duration of the refrigerating cycle 60 to the controller 410.

When the driving duration of the refrigerating cycle 60 is more than a preset driving duration, the controller 410 may judge that the refrigerating cycle 60 is mal-operated. And, the controller 410 controls a display state of the state displaying unit 50. In this case, the two flash portions 55a from the upper direction, among the flash portions 55a of the second display part 55, are controlled to flicker.

Preferably, the driving duration of the refrigerating cycle 60 is set as three hours.

Preferably, the controller 410 controls the refrigerating cycle 60 to be converted into a stopped state, as well as controls the display state of the state displaying unit 50 to be changed. Accordingly, prevented is unnecessary power consumption due to a continuous operation of the mal-operated refrigerating cycle 60.

Hereinafter, with reference to FIG. 9, will be explained a water purifying apparatus according to a fifth embodiment of the present invention.

Explanations about the same configuration as that of the first embodiment, and its detailed descriptions will be omitted.

Figure 9:
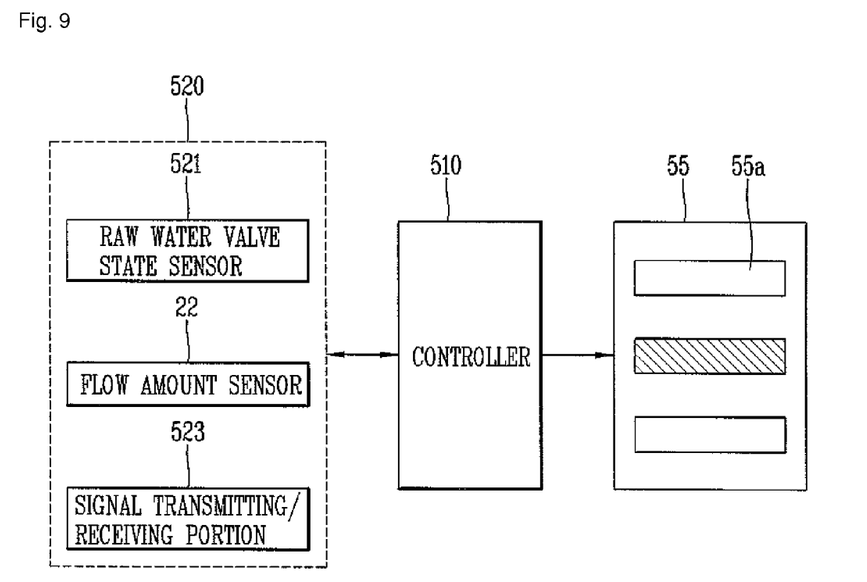
FIG. 9 is a control block diagram showing a method for detecting abnormal state information and displaying the information to outside in a water purifying apparatus according to a fifth embodiment of the present invention.

FIG. 9 is a control block diagram showing a method for detecting abnormal state information and displaying the information to outside in a water purifying apparatus according to a fifth embodiment of the present invention.

Referring to FIG. 9, the state displaying unit 50 may be configured to display abnormal state information of the water purifying apparatus 10 to outside, together with a state detecting unit 520 and a controller 510. The state detecting unit 320 detects an operation state of at least one of the filtering unit 20, the water tank unit 30, and the discharging unit 40.

The state detecting unit 520 may include a raw water valve state sensor 521 for sensing an 'ON' state of a raw water valve 24 for opening and closing an inlet of water supplied from the wellhead, a flow amount sensor 22 for sensing a flow amount of introduced raw water, and a signal transmitting/receiving portion 523 for transmitting, to the controller 510, a signal sensed by the flow amount sensor 22 under a state that the raw water valve 24 is turned on.

When the signal of the flow amount sensor 22 is constantly maintained for a preset time, or when the signal is not continuous, the controller 510 may judge that the flow amount sensor 22 is mal-operated. Accordingly, a display state of the state displaying unit 50 is controlled. That is, the two flash portions 55a from the upper direction, among the flash portions 55a of the second display part 55, are controlled to flicker.

Hereinafter, with reference to FIG. 10, will be explained a water purifying apparatus according to a sixth embodiment of the present invention.

Explanations about the same configuration as that of the first embodiment, and its detailed descriptions will be omitted.

Figure 10:
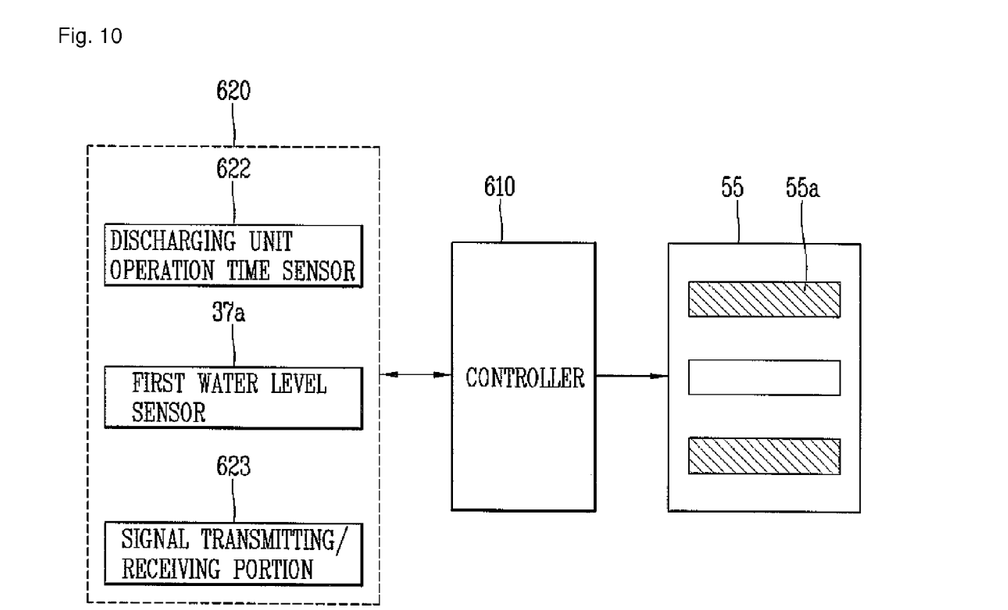
FIG. 10 is a control block diagram showing a method for detecting abnormal state information and displaying the information to outside in a water purifying apparatus according to a sixth embodiment of the present invention.

FIG. 10 is a control block diagram showing a method for detecting abnormal state information and displaying the information to outside in a water purifying apparatus according to a sixth embodiment of the present invention.

Referring to FIG. 10, the state displaying unit 50 may be configured to display abnormal state information of the water purifying apparatus 10 to outside, together with a state detecting unit 620 and a controller 610. The state detecting unit 620 detects an operation state of at least one of the filtering unit 20, the water tank unit 30, and the discharging unit 40.

The state detecting unit 620 may include a discharging unit operation time sensor 622 for sensing an accumulated operation time of the hot water discharge valve 45 and the cold water discharge valve 43 of the discharging unit 40, a first water level sensor 37a for sensing a water level of purified water stored in the storage tank 31 so as to be supplied to the cold water tank 33 and the hot water tank 35, and a signal transmitting/receiving portion 623 for transmitting, to the controller 610, the accumulated operation time of the discharging unit 40 and the water level of the storage tank 31 sensed by the first water level sensor 37a.

When the accumulation time is longer than a preset time, and when the water level of the storage tank 31 is higher than a preset water level, the controller 610 may judge that the first water level sensor 37a for sensing a water level of the storage tank 31 is mal-operated. Accordingly, a displayed state of the state displaying unit 50 is controlled. In this case, two flash portions which are located at the uppermost and lowermost sides among the flash portions 55a of the second display part 55 are controlled to flicker.

Preferably, the accumulation time is set as ten minutes, and the storage tank 31 is filled with the water up to the highest level.

Hereinafter, with reference to FIG. 11, will be explained a water purifying apparatus according to a seventh embodiment of the present invention.

Explanations about the same configuration as that of the first embodiment, and its detailed descriptions will be omitted.

Figure 11:
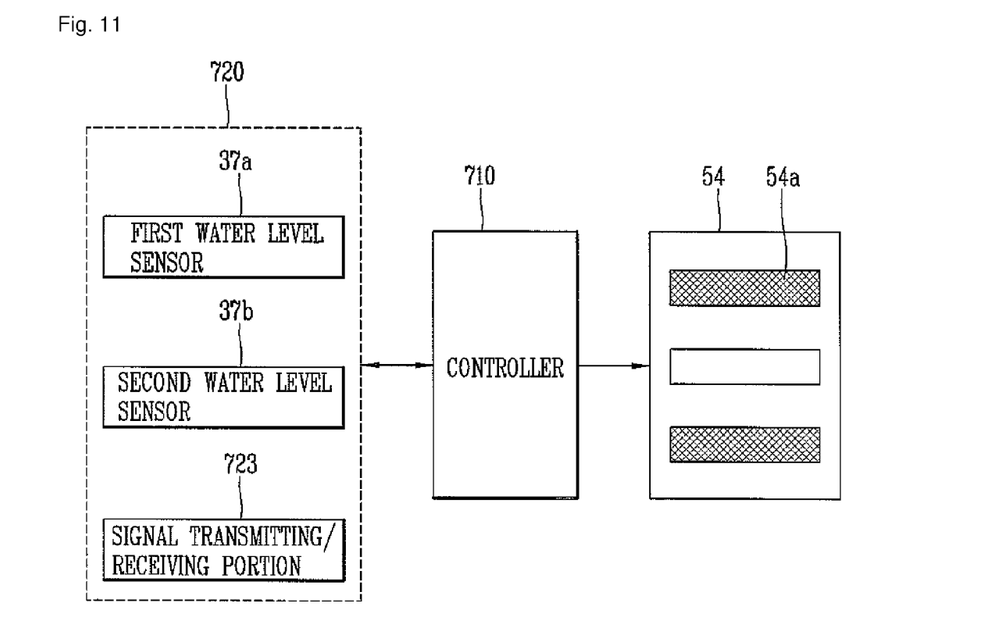
FIG. 11 is a control block diagram showing a method for detecting abnormal state information and displaying the information to outside in a water purifying apparatus according to a seventh embodiment of the present invention.

FIG. 11 is a control block diagram showing a method for detecting abnormal state information and displaying the information to outside in a water purifying apparatus according to a seventh embodiment of the present invention.

Referring to FIG. 11, the state displaying unit 50 may be configured to display abnormal state information of the water purifying apparatus 10 to outside, together with a state detecting unit 720 and a controller 710. The state detecting unit 720 detects an operation state of at least one of the filtering unit 20, the water tank unit 30, and the discharging unit 40.

The state detecting unit 720 may include a first water level sensor 37a for sensing a water level of purified water stored in the storage tank 31 so as to be supplied to the cold water tank 33 and the hot water tank 35, a second water level sensor 37b for sensing a water level of the hot water tank 35, and a signal transmitting/receiving portion 723 for transmitting the water levels sensed by the first and second water level sensors 37a, 37b to the controller 710.

When the water level of the storage tank 31 is higher than a preset water level, and when the water level of the hot water tank 35 is lower than a preset water level, the controller 710 may judge that the second water level sensor 37b for sensing the water level of the hot water tank 35 is mal-operated. Accordingly, a displayed state of the state displaying unit 50 is controlled. In this case, two flash portions which are located at the uppermost and lowermost sides among the flash portions 54a of the first display part 54 are controlled to flicker.

Since the purified water inside the storage tank 31 is supplied to the hot water tank 35 up to the highest level through the purified water supplying pipe 36, it is impossible that the hot water tank 35 is empty under a state that the storage tank 31 is filled with purified water up to the highest level. Accordingly, a reference level of the storage tank 31 is preferably set as a highest level, whereas a reference level of the hot water tank 35 is preferably set as a lowest level.

In this case, the hot water discharge valve 45 for discharging out purified water from the hot water tank 35 is in a closed state.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A water purifying apparatus, comprising:
a filtering unit;
a water tank unit comprising a cold water tank for storing cold water and a hot water tank for storing hot water;
a discharging unit for discharging out the purified water stored in the water tank unit;
a state detecting unit for detecting an operation state of at least one of the filtering unit, the water tank unit, and the discharging unit;
a controller for comparing the information detected by the state detecting unit with a preset reference, thereby judging an abnormal state of the water purifying apparatus; and
a state displaying unit for displaying the abnormal state information to outside, wherein the state displaying unit comprises:
a first display part including a plurality of flash portions independently turned on or off; and
a second display part including a plurality of flash portions independently turned on or off, wherein the flash portions of the first and second display parts are disposed in a vertical direction,
wherein the first display part is configured such that the number of the flash portions that are turned on changes according to temperature of hot water stored in the hot water tank.

2. A water purifying apparatus, comprising:
a filtering unit;
a water tank unit comprising a cold water tank for storing cold water and a hot water tank for storing hot water;
a discharging unit for discharging out the purified water stored in the water tank unit;
a state detecting unit for detecting an operation state of at least one of the filtering unit, the water tank unit, and the discharging unit;
a controller for comparing the information detected by the state detecting unit with a preset reference, thereby judging an abnormal state of the water purifying apparatus; and
a state displaying unit for displaying the abnormal state information to outside, wherein the state displaying unit comprises:
a first display part including a plurality of flash portions independently turned on or off; and
a second display part including a plurality of flash portions independently turned on or off, wherein the flash portions of the first and second display parts are disposed in a vertical direction, and
wherein the second display part is configured such that the number of the flash portions that are turned on changes according to temperature of cold water stored in the cold water tank.

3. A water purifying apparatus, comprising:
a filtering unit;
a water tank unit comprising a cold water tank for storing cold water, and a hot water tank for storing hot water;
a discharging unit for discharging out the purified water stored in the water tank unit;
a state detecting unit for detecting an operation state of at least one of the filtering unit, the water tank unit, and the discharging unit;
a controller for comparing the information detected by the state detecting unit with a preset reference, thereby judging an abnormal state of the water purifying apparatus; and
a state displaying unit for displaying the abnormal state information to outside, wherein the state displaying unit comprises:
a first display part including a plurality of flash portions independently turned on or off; and
a second display part including a plurality of flash portions independently turned on or off, wherein the flash portions of the first and second display parts are disposed in a vertical direction, and wherein the state detecting unit is configured to input a predetermined signal to a hot water sensor provided to detect an inner temperature of the hot water tank, and then to detect an output signal, and
wherein when the output signal from the hot water sensor is different from a preset value, the controller judges that the hot water sensor is in a mal-operated state, and
wherein the state displaying unit is configured to make all the flash portions of the first display part flicker.

4. The water purifying apparatus of claim 3, wherein when it is judged that the hot water sensor has a breakdown, the controller is configured to convert a current state of a heater provided to heat the hot water tank, into an 'OFF' state.

5. A water purifying apparatus, comprising:
a filtering unit;
a water tank unit comprising a cold water tank for storing cold water, and a hot water tank for storing hot water;
a discharging unit for discharging out the purified water stored in the water tank unit;
a state detecting unit for detecting an operation state of at least one of the filtering unit, the water tank unit, and the discharging unit;
a controller for comparing the information detected by the state detecting unit with a preset reference, thereby judging an abnormal state of the water purifying apparatus; and
a state displaying unit for displaying the abnormal state information to outside, wherein the state displaying unit comprises:
a first display part including a plurality of flash portions independently turned on or off; and
a second display part including a plurality of flash portions independently turned on or off, wherein the flash portions of the first and second display parts are disposed in a vertical direction, and
wherein the state detecting unit is configured to input a predetermined signal to a cold water sensor provided to detect an inner temperature of the cold water tank, and then to detect an output signal, and
wherein when the output signal from the cold water sensor is different from a preset value, the controller judges that the cold water sensor is in a mal-operated state, and
wherein the state displaying unit is configured to make all the flash portions of the second display part flicker.

6. The water purifying apparatus of claim 5, wherein when it is judged that the cold water sensor has a breakdown, the controller is configured to stop a driving of a refrigerating cycle provided to cool the cold water tank.

7. A water purifying apparatus, comprising:
a filtering unit;
a water tank unit comprising a cold water tank for storing cold water, and a hot water tank for storing hot water;
a discharging unit for discharging out the purified water stored in the water tank unit;
a state detecting unit for detecting an operation state of at least one of the filtering unit, the water tank unit, and the discharging unit;
a controller for comparing the information detected by the state detecting unit with a preset reference, thereby judging an abnormal state of the water purifying apparatus; and
a state displaying unit for displaying the abnormal state information to outside, wherein the state displaying unit comprises:
a first display part including a plurality of flash portions independently turned on or off; and
a second display part including a plurality of flash portions independently turned on or off, wherein the flash portions of the first and second display parts are disposed in a vertical direction, and
wherein the state detecting unit detects an 'ON' state of a heater for heating the hot water tank, and an inner temperature of the hot water tank per a preset period, and
wherein when an increase width of the inner temperature of the hot water tank per a preset period is less than a preset increase width, the controller judges that the heater is in a mal-operated state and displays the state of the heater using the state displaying unit.

8. The water purifying apparatus of claim 7, wherein the controller is configured to convert a current state of the heater into an 'OFF' state.

9. A water purifying apparatus, comprising:
a filtering unit;
a water tank unit comprising a cold water tank for storing cold water, and a hot water tank for storing hot water;
a discharging unit for discharging out the purified water stored in the water tank unit;
a state detecting unit for detecting an operation state of at least one of the filtering unit, the water tank unit, and the discharging unit;
a controller for comparing the information detected by the state detecting unit with a preset reference, thereby judging an abnormal state of the water purifying apparatus; and
a state displaying unit for displaying the abnormal state information to outside, wherein the state displaying unit comprises:
a first display part including a plurality of flash portions independently turned on or off; and
a second display part including a plurality of flash portions independently turned on or off, wherein the flash portions of the first and second display parts are disposed in a vertical direction, and
wherein the state detecting unit detects a driving state of a refrigerating cycle for cooling the cold water tank, and a driving duration of the refrigerating cycle, and
wherein when the driving duration of the refrigerating cycle is more than a preset driving duration, the controller judges that the refrigerating cycle is in a mal-operated state, and displays the state of the refrigerating cycle using the state displaying unit.

10. The water purifying apparatus of claim 9, wherein the controller stops the refrigerating cycle when the refrigerating cycle is judged as in a mal-operated state.

11. A water purifying apparatus, comprising:
a filtering unit;
a water tank unit comprising a cold water tank for storing cold water, and a hot water tank for storing hot water;
a discharging unit for discharging out the purified water stored in the water tank unit;
a state detecting unit for detecting an operation state of at least one of the filtering unit, the water tank unit, and the discharging unit;
a controller for comparing the information detected by the state detecting unit with a preset reference, thereby judging an abnormal state of the water purifying apparatus; and
a state displaying unit for displaying the abnormal state information to outside, wherein the state displaying unit comprises:
a first display part including a plurality of flash portions independently turned on or off; and
a second display part including a plurality of flash portions independently turned on or off, wherein the flash portions of the first and second display parts are disposed in a vertical direction, and
wherein the state detecting unit detects an 'ON' state of a raw water valve for opening and closing an inlet of water, and detects a signal of a flow amount sensor for sensing a flow amount of introduced raw water, and
wherein when the signal of the flow amount sensor is constantly maintained over a preset time or when the signal is not continuous within a preset time, the controller judges that the flow amount sensor is in a mal-operated state, and displays the state of the flow amount sensor using the state displaying unit.

12. A water purifying apparatus, comprising:
a filtering unit;
a water tank unit comprising a cold water tank for storing cold water, and a hot water tank for storing hot water;
a discharging unit for discharging out the purified water stored in the water tank unit;
a state detecting unit for detecting an operation state of at least one of the filtering unit, the water tank unit, and the discharging unit;
a controller for comparing the information detected by the state detecting unit with a preset reference, thereby judging an abnormal state of the water purifying apparatus; and
a state displaying unit for displaying the abnormal state information to outside, wherein the state displaying unit comprises:
a first display part including a plurality of flash portions independently turned on or off; and
a second display part including a plurality of flash portions independently turned on or off, wherein the flash portions of the first and second display parts are disposed in a vertical direction, and
wherein the state detecting unit detects an accumulation time of water from the discharging unit, and a water level of a storage tank for storing purified water supplied into the cold water tank and the hot water tank, and
wherein when the accumulation time of water is longer than a preset time and when the water level of the storage tank is higher than a preset water level, the controller judges that a first water level sensor for sensing a water level of the storage tank is in a mal-operated state, and displays the state of the first water level sensor using the state displaying unit.

13. A water purifying apparatus, comprising:

a filtering unit;

a water tank unit comprising a cold water tank for storing cold water, and a hot water tank for storing hot water;

a discharging unit for discharging out the purified water stored in the water tank unit;

a state detecting unit for detecting an operation state of at least one of the filtering unit, the water tank unit, and the discharging unit;

a controller for comparing the information detected by the state detecting unit with a preset reference, thereby judging an abnormal state of the water purifying apparatus; and a state displaying unit for displaying the abnormal state information to outside, wherein the state displaying unit comprises:

a first display part including a plurality of flash portions independently turned on or off; and a second display part including a plurality of flash portions independently turned on or off, wherein the flash portions of the first and second display parts are disposed in a vertical direction, and wherein the state detecting unit detects a water level of a storage tank for storing purified water to be supplied into the cold water tank and the hot water tank, and detects a water level of the hot water tank, and wherein when the water level of the storage tank is higher than a preset water level, and when the water level of the hot water tank is lower than a preset water level, the controller judges that a second water level sensor for sensing the water level of the hot water tank is in a mal-operated state, and displays the state of the second water level sensor using the state displaying unit.

* * * * *